(No Model.) 3 Sheets—Sheet 1.

J. W. BROWN, Jr.
DRILLING MACHINE.

No. 518,176. Patented Apr. 10, 1894.

Witnesses:

Inventor
John Wilson Brown Jr.
by his Attorneys (No Model.)

3 Sheets—Sheet 2.

J. W. BROWN, Jr.
DRILLING MACHINE.

No. 518,176.

Patented Apr. 10, 1894.

Witnesses:
Hamilton D. Turner
William A. Barr

Inventor:
John Wilson Brown Jr.
by his Attorneys
Howson & Howson (No Model.) 3 Sheets—Sheet 3.
J. W. BROWN, Jr.
DRILLING MACHINE.

No. 518,176. Patented Apr. 10, 1894.

Witnesses:
Hamilton D. Turner
William N. Parr

Inventor:
John Wilson Brown Jr.
by his Attorneys
Horem & Hinem

UNITED STATES PATENT OFFICE.

JOHN WILSON BROWN, JR., OF PHILADELPHIA, PENNSYLVANIA, ASSIGNOR TO THE ENTERPRISE MANUFACTURING COMPANY, OF SAME PLACE.

DRILLING-MACHINE.

SPECIFICATION forming part of Letters Patent No. 518,176, dated April 10, 1894.

Application filed October 13, 1893. Serial No. 488,025. (No model.)

*To all whom it may concern:*

Be it known that I, JOHN WILSON BROWN, Jr., a citizen of the United States, residing in Philadelphia, Pennsylvania, have invented certain Improvements in Drilling-Machines, of which the following is a specification.

The object of my invention is to so construct a drill press that it will automatically feed the material to the drill and reverse itself when the hole has reached a certain depth and will stop at a predetermined point, this object I attain in the following manner, reference being had to the accompanying drawings, in which—

Figure 1:
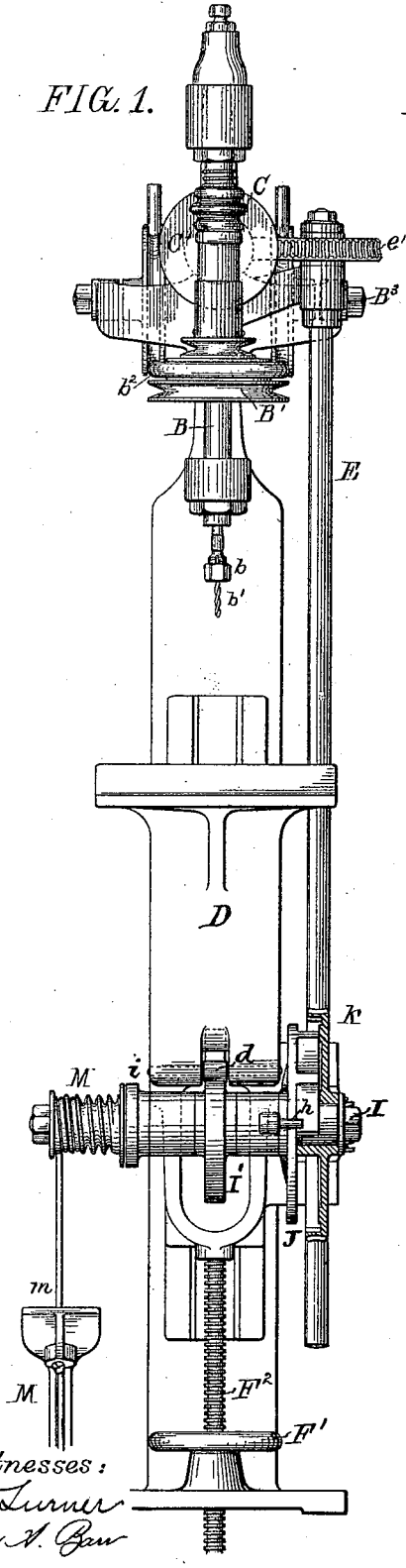
Figure 2:
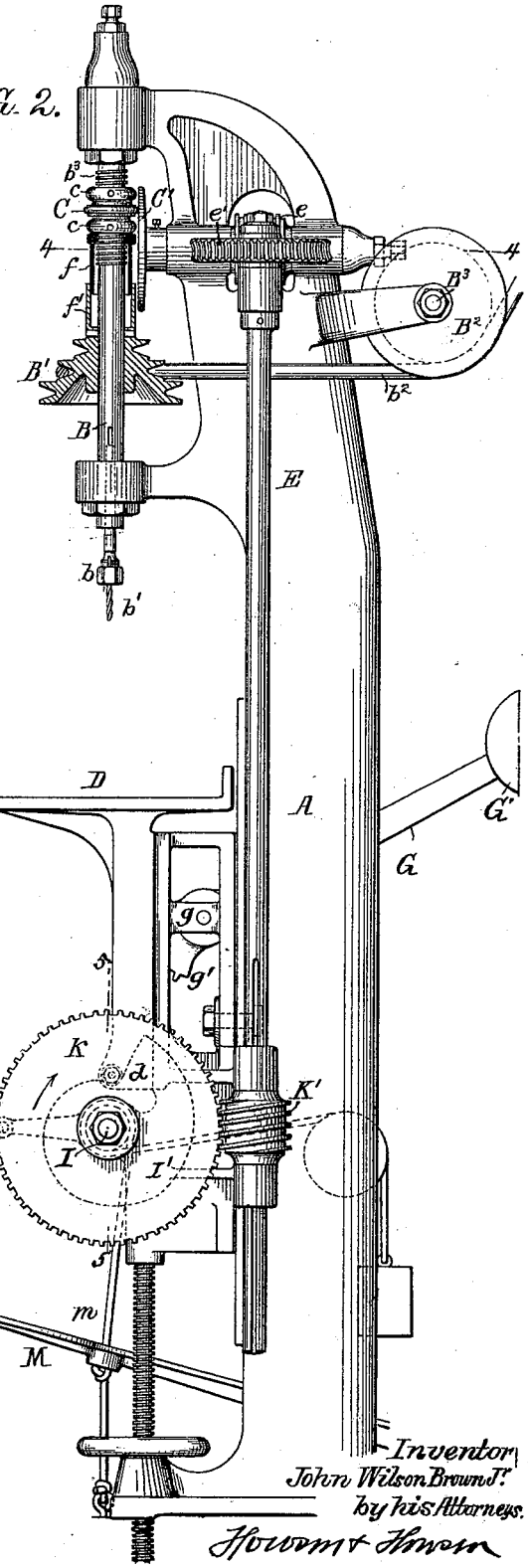
Figure 3:
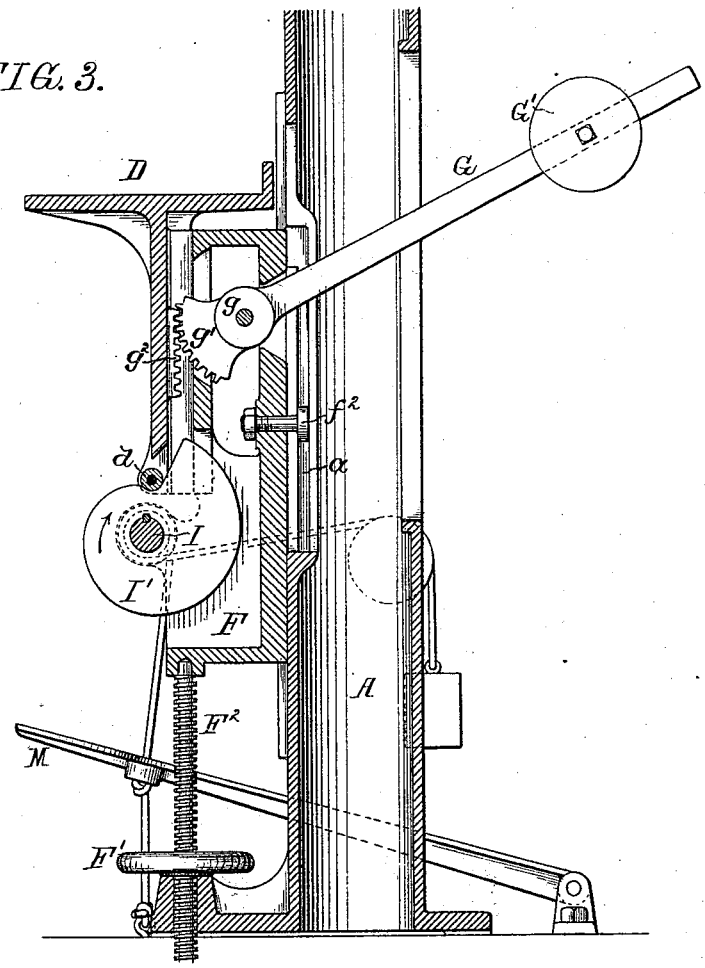
Figure 4:
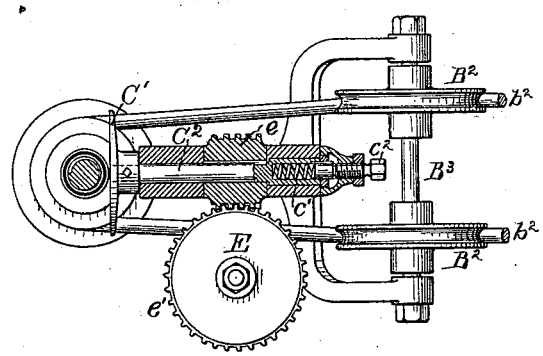
Figure 5:
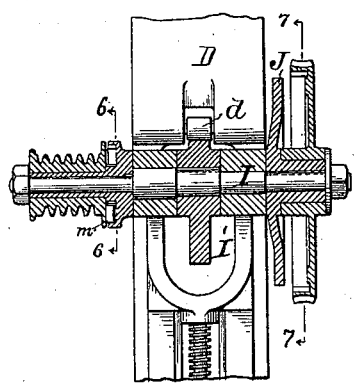
Figure 6:
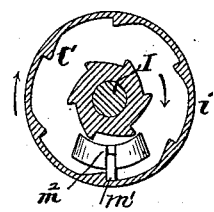
Figure 7:
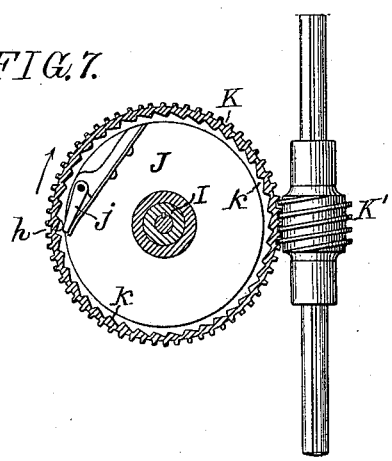

Figure 1, is a front view of my improved drill press. Fig. 2, is a side view partly in section. Fig. 3, is a view of the base portion of the press. Fig. 4, is a section on the line 4—4, Fig. 2. Fig. 5, is a section on the line 5—5, Fig. 2. Fig. 6, is a section on the line 6—6, Fig. 5. Fig. 7, is a section on the line 7—7, Fig. 5.

A is the frame of the drilling machine or press, mounted in the upper portion of the press is a drill spindle B provided with a chuck $b$ for clamping the drill $b'$ to the spindle. On the spindle is the cone pulley $B'$ driven by a belt $b^2$ which passes around idlers $B^2$ on the shaft $B^3$ mounted in bearings in the frame of the machine. On the spindle B is a screw thread $b^3$ to which are adapted nuts $c$, between the nuts is a friction wheel C which bears against a friction disk $C'$ on the shaft $C^2$ having its bearings in the frame A of the machine. On this shaft $C^2$ is a worm $e$ meshing with a worm wheel $e'$ on a vertical feed shaft E. The friction disk $C'$ is forced against the friction wheel C by a spring $c'$ and the tension of this spring is regulated by a set screw $c^2$ shown in Fig. 4. Adapted to the screw thread $b^3$ on the spindle B is a casing $f$ extending into a cup $f'$ on the pulley $B'$, thus preventing oil gaining access to the friction disk.

D is the table upon which is mounted the article to be drilled, this table is adapted to ways on an adjustable slide F, which can be vertically adjusted on the standard or frame A by a hand wheel $F'$ adapted to a screw $F^2$ which rests in a pocket in the under side of the slide. A bolt $f^2$ passes through the slide F into the frame A, the head of the bolt resting in a slot $a$ in said frame so that by raising or lowering the slide F the table can be adjusted to any position desired and the slide can be secured by the bolt $f^2$, but it will be understood that the table D has a vertical movement independent of the slide F so that the work can be automatically fed to the drill.

Pivoted at $g$ to the frame F is a counterbalance lever G having a counterbalance weight $G'$, the short arm $g'$ of the lever is in the form of a toothed segment engaging with a rack $g^2$ on the table D, thus the table is counterbalanced by the weighted lever.

I is a transverse shaft which is geared to the vertical feed shaft E in the manner described hereinafter and secured to this shaft I is a cam $I'$ which elevates the table when the shaft is moved in the direction of the arrow Fig. 3; resting on this cam $I'$ is a roller $d$ mounted on the table D.

On the shaft I is a disk J having a spring pawl $j$ which engages with internal teeth $k$ on the worm wheel K, the external teeth of this worm wheel engaging with a worm $K'$ adapted to slide on but turn with the vertical shaft E. The worm is mounted between two bearings on the frame F and is splined to the shaft, as clearly shown in the drawings. On the frame F is a pin $h$ against which strikes the pawl $j$ when it is carried around a certain distance by the worm wheel K, as shown in Fig. 7, the pin throwing the pawl out of engagement with the worm wheel, thus stopping the upward feed of the table, at the same time the cam I reaches its full elevation and allows the table with the work to drop clear of the drill, as shown in Fig. 3.

M is a treadle from which passes a rope $m$ around a grooved drum $M'$ loose on the shaft I, carried by this drum in a pawl $m'$ of the form shown in Fig. 6, adapted to slideway $m^2$ in the drum, this pawl engages with the teeth $i'$ on the sleeve $i$ secured to the shaft I when the treadle M is depressed; the shaft is turned and the table with the work is raised to the drill, the pawl $j$ is also free to engage with the teeth $k$ of the worm wheel K and the table is thus set in motion to gradually feed the work to the drill.

I claim as my invention—

1. The combination in a drill press, of the drill spindle, mechanism for revolving said spindle, a vertically movable table carrying the work, a shaft, a cam on said shaft, for raising the table, mechanism for revolving said shaft, and mechanism for throwing the shaft out of gear with the revolving mechanism, substantially as described.

2. The combination in a drill press, of the spindle, mechanism for revolving the same, a vertically movable work table, a shaft and cam thereon, acting to elevate the table, a pawl carried by said shaft, a wheel loose on the shaft having teeth with which the pawl engages, mechanism for continuously revolving said wheel, and a pin for throwing the pawl out of engagement with the wheel, substantially as described.

3. The combination of the standard, the spindle, mechanism for revolving the spindle, and an adjustable slide adapted to the standard, shaft carried by said slide, a work table mounted on the slide above the shaft, a cam on the shaft bearing against the work table, a disk, a spring pawl mounted on said disk, a toothed wheel with which the pawl engages, a stationary pin for throwing the pawl out of engagement with the wheel when the cam reaches a certain point, a drum on the shaft, and a cord and treadle, whereby on the depression of said treadle the shaft will turn with the drum, and elevate the work to the drill, substantially as described.

4. The combination in a drill press, of the drill spindle, mechanism for revolving the same, a vertically movable work table, a cam for raising said table, a shaft on which the cam is mounted, a pawl and ratchet mechanism through which the said shaft is operated, a rope drum on the shaft, and a rope and treadle, with a pawl and ratchet connection between the drum and a disk on the shaft, so that when the treadle is depressed the shaft will be turned and the table elevated, substantially as described.

5. The combination of the standard, the spindle, bearings therefor, a drill adapted to said spindle, a belt wheel on the spindle, a friction wheel adjustable on the spindle, a friction disk bearing against said friction wheel, a shaft on which said disk is mounted, a worm on said shaft, a worm wheel gearing with said worm, a vertical feed shaft, a cam shaft geared to the feed shaft by a worm and worm wheel, and pawl and ratchet mechanism, a cam on said shaft, and a vertically movable work table acted upon by said cam, substantially as described.

In testimony whereof I have signed my name to this specification in the presence of two subscribing witnesses.

JOHN WILSON BROWN, JR.

Witnesses:
EDWIN C. FREEMAN,
WILLIAM A. BARR.